United States Patent Office 3,567,729
Patented Mar. 2, 1971

3,567,729
DIQUATERNARY AMMONIUM HALIDES
Morton Lewis, Elmhurst, and Thomas W. Findley, Chicago, Ill., assignors to Swift & Company, Chicago, Ill.
No Drawing. Continuation-in-part of application Ser. No. 553,019, May 26, 1966. This application Jan. 12, 1968, Ser. No. 697,291
Int. Cl. C07d *51/72*
U.S. Cl. 260—268          5 Claims

ABSTRACT OF THE DISCLOSURE

Quaternary ammonium salts are produced by reacting in the liquid phase, in the presence of water, tertiary amines and 1-halo, 2-hydroxy, 3-alkoxypropanes or by reacting tertiary amine hydrohalides and glycidyl ethers. The compositions possess surfactant properties and can be used as emulsifying agents, germicides, etc.

---

This application is a continuation-in-part of Ser. No. 553,019 filed May 26, 1966.

The invention relates to a new class of quaternary ammonium salts and to a method for preparing quaternary ammonium salts. More particularly the method relates to the preparation of quaternary ammonium salts by reacting tertiary amines or derivatives thereof and substituted propanes wherein the terminal position is substituted with a fatty alkoxy group.

The products of the invention have outstanding properties as surface active agents because of a uniquely low surface tension in water. Another desirable characteristic is the very low interfacial tension they exhibit at certain interfaces, such as water-benzene and water-hexane interfaces, which makes them excellent emulsifying agents. Despite these desirable properties, a major obstacle to preparation and commercial usage of these quaternary amines has been the previously known slow and impurity producing reaction processes for making quaternary ammonium salts. Prior art methods of making 2-hydroxy-3-alkoxy propyl ammonium salts have required long reaction times and have resulted in the production of large quantities of undesirable by-products. Indeed, it has been impossible to obtain a satisfactory reaction rate or product yield using a fatty alkoxy substituted reactant.

It is therefore an object of this invention to provide new quaternary ammonium salts.

A further object of this invention is to provide an improved method for producing quaternary ammonium salts including a 2-hydroxy, 3-alkoxy propyl group.

Another object of the invention is the provision of a rapid method for reacting a tertiary amine and a 1-halo, 2-hydroxy, 3-alkoxy propane to form a quaternary ammonium salt.

Another object of the invention is the provision of a method for making quaternary ammonium salts by reacting a tertiary amine hydrohalide and a glycidyl ether.

Additional objects will be readily apparent to those skilled in the art from the detailed description of the invention which follows.

Generally, the invention involves the discovery that quaternary ammonium salts may advantageously be produced by reacting in the liquid phase, in the presence of water, tertiary amines and 1-halo, 2-hydroxy, 3-alkoxy propanes or by reacting tertiary amine hydrohalides and glycidyl ethers. The water is absolutely necessary for the reaction, for without the presence of water, little or no quaternary salt is produced. The method makes possible the synthesis of new quaternary salts wherein the quaternized nitrogen atom has a 2-hydroxy, 3-alkoxy propyl radical attached thereto.

More particularly, the method of the invention involves the production of quaternary ammonium salts, some of which can be characterized by the groupings

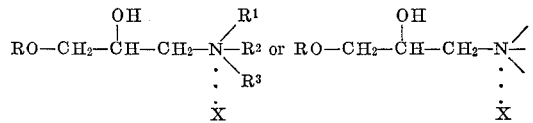

wherein R is a fatty chain containing 8–18 carbons, $R^1$ is a benzyl, a substituted benzyl or a $C_8$–$C_{18}$ alkyl radical and $R^2$ and $R^3$ are $C_1$–$C_{18}$ alkyl radicals. X is a halogen and

is part of a saturated or unsaturated, five or six member heterocyclic ring wherein the ring contains carbon, and may include oxygen or sulfur. The heterocyclic ring may be substituted with alkyl groups, preferably of one to eight carbons. Further, the carbons of said heterocyclic ring may also be part of another ring system. A tertiary amine and the condensation product of a fatty alcohol and an epihalohydrin may be reacted in an aqueous environment to form the quaternary salt. Alternatively, a tertiary amine hydrohalide may be reacted with a glycidyl ether. The reaction conditions for the alternate reaction correspond to the reaction of the tertiary amine and substituted propane. Preferably the quaternization reaction is conducted within a definite temperature range and with constant agitation. Refluxing of the reaction mass provides a convenient method of maintaining a uniform temperature throughout the reaction mixture. The inventive method provides for rapid reaction rate and substantial completion of the reaction may occur within 4 hours.

In general, the compositions of this invention may be defined as quaternary ammonium halides having the formula

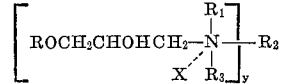

wherein R is a carbon chain of about 8–18 carbons, X is halogen and y is 1 or 2, $R_1$, $R_2$ and $R_3$ are the same or different and are aliphatic or aromatic radicals of up to about 30 carbons each, $R_1$ and $R_3$ or $R_1$, $R_2$ and $R_3$ can be combined to form heterocyclic rings and when y is 2 then $R_2$ is a divalent radical and both $R_1$'s and both $R_3$'s can be the same or different.

The heterocyclic quaternary ammonium halides may also be represented by the formula:

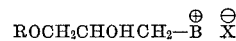

wherein

is a heterocyclic radical containing a tetravalent nitrogen atom and the

is part of a heterocyclic ring system that can also contain other hetro atoms such as nitrogen, sulfur, oxygen, boron, phosphorus, etc. The heterocyclic radical,

can be saturated or unsaturated, cycloaliphatic or aromatic of one or more rings that can be unsubstituted or substituted with non-interfering substituents. When the

is not part of an aromatic system, then two of the bonds define a saturated heterocyclic system that can be unsubstituted or substituted with a straight or branched chain alkyl, alkenyl, alkynyl group of 1–30 carbon atoms, preferably 1–8 carbons, and can contain halide or hydroxy functions, or an arylalkyl, alkylaryl, alkoxy, aryloxy or heterocyclic substituted alkyl group. The third bond can attach to a straight or branched chain alkyl, alkenyl, alkynyl group of 1–30 carbons, or alkylaryl, arylalkyl, or heterocyclic substituted alkyl group and the fourth bond is attached to the defined 3-ether substituted 2-hydroxy propane. R is a fatty chain of 8–22 carbons which is generally unsubstituted but can be substituted with non-interfering groups and $\overset{\ominus}{X}$ is a middle halogen, i.e., chlorine, bromine or iodine. A subdivision of the heterocyclic quaternary ammonium halides can be represented by the above formula with $\overset{\oplus}{B}$ being a 5 or 6 member monocyclic ring of carbon and nitroen and sometimes oxygen, either saturated or unsaturated and either unsubstituted or substituted with alkyl or alkenyl or arylalkyl groups of 1–8 carbon atoms.

Another subclass of compounds that can be produced by the process of this invention is what can be called the benzyl derivatives and represented by the formula:

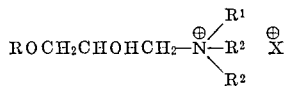

wherein $R^1$ is a benzyl radical ($C_6H_5CH_2$—) which in turn can be unsubstituted or substituted with 1–3 alkyl or alkenyl groups of 1–8 carbon atoms. $R^2$ and $R^3$ can be the same or different and represent straight or branched chain alkyl, alkenyl, alkynyl, hydroxyalkyl groups of 1–30 carbons, or arylalkyl, alkylaryl, alkoxy, aryloxy or heterocyclic substituted alkyl groups. Further, $R^2$ can be benzyl or substituted benzyl and X is a middle halogen. Preferred benzyl quaternaries are those defined by the above formula with the provision that $R^1$ is benzyl or substituted benzyl having 1–3 alkyl groups of 1–4 carbons each and $R^2$ and $R^3$ are the same or different and represent alkyl, alkenyl or hydroxy substituted alkyl groups of 1–4 carbon atoms. R is a fatty group of 8–18 carbons and X is a middle halogen.

Another class of quaternaries produced by the methods of this invention can be represented by the formula:

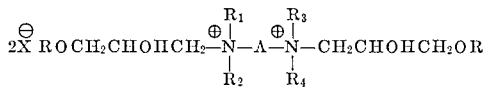

wherein R is a fatty group of 8–18 carbons, X is a middle halogen and $R_1$, $R_2$, $R_3$ and $R_4$ can be the same or different and can be straight or branched chain alkyl, alkenyl, alkynyl radicals of 1–30 carbons, or alkylaryl, arylalkyl or aryl groups. A is a divalent alkyl, alkenyl, or alkynyl radical of 1–20 carbons or aryl, alkylaryl or arylalkyl divalent radical. Further, $R_1$ and $R_3$ can be combined with A to form a heterocyclic system and $R_1$ and $R_3$ along with $R_2$ and $R_4$ can be combined with A to form an aromatic heterocyclic system. A preferred subdivision of this class of quaternaries is represented when A defines a phenylene radical (o, m, p) and $R_1$, $R_2$, $R_3$ and $R_4$ are alkyl, alkenyl or hydroxy alkyl groups of 1–8 carbons. Still another preferred subdivision of this class can be represented by the formula:

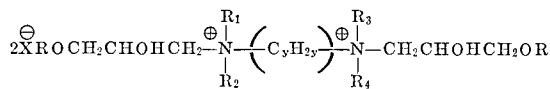

wherein R is a fatty group of 8–18 carbons, X is a middle halogen, $y$ is an integer of 1–8, preferable 1–4 and $R_1$, $R_2$, $R_3$ and $R_4$ are the same or different and are alkyl, alkenyl or hydroxy alkyl, aryl or alkylaryl or arylalkyl groups of 1–12 carbons and preferably alkyl or hydroxy alkyl groups of 1–4 carbon atoms.

The halogen-substituted propane used as a reactant in the instant method may be synthesized by condensing a fatty alcohol with an epihalohydrin using stannic chloride as a catalyst. The product is a 1-halo, 2-hydroxy, 3-alkoxy propane. This condensation reaction is described in U.S. Pat. 2,327,053. The alkoxy groups which are derived from a fatty alcohol may vary in length from 8–18 carbon atoms. Use of a substituted propane derived from a mixture of long chain alcohols is also contemplated, for instance a mixture of $C_{16}$ and $C_{18}$ fatty alcohols obtained from tallow or a mixture of $C_{10}$ to $C_{14}$ fatty alcohols obtained from coconut oil. The halide substituent may be a chloride, bromide or iodide.

The amine reactant may in general be any tertiary amine. All trialkyl amines of small chain length, 1–4 carbon atoms, produce quaternary salts exhibiting good surface activity. Especially effective are amines wherein one of the alkyl chains is from 8–18 carbon atoms. Alkyl dimethyl amines wherein the alkyl group contains 5–22 carbon atoms, such as dodecyl, tetradecyl, hexadecyl or hydrogenated tallow, also produce interesting surface active products. Also contemplated as the amine reactant are benzyl amines and heterocyclic tertiary amines such as pyridine and N-alkyl, N-morpholines and ditertiary amines such as substituted piperazines and tetralkyl alkylene diamines.

Specific examples of teritary benzylamines include diethylbenzylamine, diethanol benzylamine, dimethylbenzylamine, methyl ethanolbenzylamine, methyl propylbenzylamine, ethyl isopropylbenzylamine, methyl dibenzylamine, dibutylbenzylamine, dioctylbenzylamine, dilaurylbenzylamine, ethyl laurylbenzylamine. Also useful are phenyl substituted benzylamines wherein the phenyl group is substituted with 1–5 radicals each having 1–18 carbons such as dimethyl, o-ethylbenzylamine; diethyl, (o, m, p) isopropylbenzylamine; diethyl, o-butylbenzylamine; dimethyl, methylbenzylamine;) dimethyl, dodecylbenzylamine, etc. In this regard it should be mentioned that the benzyl derivatives possess bacteriostatic properties in addition to their surfactant ability. In fact, outstanding germicides may be produced by using dimethyl benzylamine to form the quaternary.

Important specific tertiary diamines include tetraethylethylenediamine, tetramethylpropylenediamine, tetraethylpropylenediamine, tetramethylbutylenediamine, tetramethylhexylenediamine, tetraoctylethylenediamine, triethylbenzylethylenediamine, triethylbenzylbutylenediamine, dimethyldibenzylpropylenediamine, tetramethylphenylenediamine, tetrabutylphenylenediamine, triethylbenzylphenylenediamine, diethyldibenzylphenylenediamine, tetraethylchlorophenylenediamine. In addition, specific piperazines can be mentioned either under the class of heterocyclic amines or as tertiary diamines such as 1,2,4-trimethylpiperazine.

Glycidyl ethers corresponding to the above-described substituted propanes are utilized in the alternate method of synthesis of the quaternary ammonium salt. These glycidyl ethers are characterized by the structure

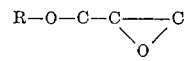

wherein R is a carbon fatty chain having about 8–18 carbons. Mixtures of n-alkyl glycidyl ethers are available commercially.

The amine hydrohalide reactant suitable in the alternate method may be obtained by reacting a tertiary amine and a hydrogen halide. Amine hydrohalides which have utility include those derived from trialkyl amines, heterocyclic tertiary amines such as pyridine and N-methyl morpholine and ditertiary amines such as substituted piperazines and tetramethyl ethylene diamine.

Water must be present in the reaction system, for without water an a mine hydrohalide and a glycidyl ether are believed to be formed and/or remain unreactive and little or none of the quaternary ammonium salt is formed. Evidently the water acts as a solvent to dissolve the amine hydrohalide. The amount of water present in the reaction system should therefore be sufficient to dissolve any tertiary amine hydrohalide which may be present. Generally from 15 to 100 percent of water based on total solvent produces satisfactory results with 75 to 90 percent of solvent preferred because it gives a better product in a shorter reaction time while still keeping viscosity within acceptable limits. It is sometimes preferable to intermittently add water during the reaction.

The amount of solvent or "total solvent" employed in the process is such that the water content usually approximates at least about 15% by weight based on the reactants (amine-halide mixture). Larger amounts of about 50–200% water based upon the total reactants is preferred. Still greater amounts can be used but usually the benefit derived from the use of larger water-reactant ratios is not commensurate with the added cost.

It has been found desirable, due to the physical mechanics involved in heating and stirring the liquid reaction mass, to add a viscosity-reducing agent such as isopropyl alcohol. The alcohol prevents undue viscosity buildup and gelation, but is not necessary for the chemical reaction as is the water. The amount of isopropyl alcohol which is used varies with the chain lengths of the alkyl groups on the amine and the alkoxy group of the halide, and also varies with the desired concentration of the final product. More alcohol is necessary to have a 50% by weight solution than a 33⅓% by weight solution.

The process involves the reaction of equivalent quantities of tertiary amine or hydrohalide and the alkoxy supplying reactant. It is readily apparent that the reactants may be employed in other desired ratios during the reaction and the excess subsequently removed. Preferably the mole ratio of the alkoxy reactant to amine is from 0.90 to 1.0 to 1 when the amine reactant contains a single tertiary nitrogen per molcule.

The method of the invention allows production of new quaternary ammonium salts including diquaternary salts having attached to each quaternized nitrogen a 2-hydroxy, 3-alkoxy propyl radical wherein the alkoxy group includes a $C_8$–$C_{18}$ hydrocarbon chain. Suitable diertiary amine reactants include substituted piperazines and tetralkyl alkylene diamines such as tetramethylethylene diamine. These compounds are excellent emulsifying agents.

The present method also makes possible the synthesis of quaternary ammonium salts wherein the quaternized nitrogen is part of a heterocyclic ring system and has an attached 2-hydroxy, 3-alkoxy propyl radical. Such compounds include the reaction products of 1-halo, 2-hydroxy, 3-alkoxy propanes and N-alkyl morpholines, pyridine, substituted and unsubstituted piperazines, isoquinolines, quinolines, and pyrroles. These compounds are also excellent emulsifying agents.

The following examples illustrate the invention.

EXAMPLE I (A) 2-hydroxy, 3-dodecoxypropyl dimethyl dodecyl ammonium chloride: Into a 1-l. 4-neck round bottom flask equipped with a motor driven stirrer, a reflux condenser, a thermometer, and a dropping funnel, was weighed 140 g. (0.5 mole) 1-chloro, 2-hydroxy, 3-dodecoxypropane and 107 g. (0.5 mole) dodecyl dimethyl amine. The solvent, 205 cc. water and 42 cc. isopropyl alcohol, was added and the reaction mixture heated to reflux with rapid stirring. The alcohol was added initially with the water to avoid gel formation. After four hours of reflux, the reaction mixture became sufficiently homogeneous to clear and another 205 cc. $H_2O$ and 42 cc. isopropyl alcohol was added slowly through the dropping funnel. The temperature was never allowed to drop below 90° C. The reaction mixture was refluxed for two additional hours after all the solvent was added. The final product was a nearly clear homogeneous solution of 33⅓% concentration by w./v. (33⅓ g. of product per 100 ml. of solution) with thickened somewhat on cooling. The product contained 11.3% alcohol by volume. This product reduced the interfacial tension of the benzene-water interface as well as the hexane-water interface to less than 0.1 dyne/cm. at concentrations as low as 0.0001%.

(B) The procedure of A above was followed, except that no water was added as a solvent. Into a 250 ml. Erlenmeyer flask, fitted with an air-cooled condenser, was weighed 28 g. (0.1 mole) 1-chloro, 2-hydroxy, 3-dodecoxypropane and 21.4 g. (0.1 mole) dodecyldimethylamine. 25 cc. of isopropyl alcohol was added and no water was used in this run. The reaction media was heated to reflux and stirred by means of a hot plate-magnetic stirrer combination. Heating at reflux was continued for a total of 6 hours, after which the reactants were allowed to cool and the solvent removed by evaporation under reduced pressure. A small sample of the product when diluted with water formed an insoluble oil layer, and when it was vigorously shaken produced an emulsion with a very small amount of foam. A sample of the product was analyzed for oxirane oxygen and chloride ion. There was no apparent oxirane oxygen and the chloride ion analyzed 1.3%. Theoretical chloride ion for the quaternary product is 7.23%. Therefore, the reaction in the absence of water and for the same reaction time, as in Example A was only 18% of theoretical.

A Fisher moisture determination was run on the isopropyl alcohol and established 0.5% water in the alcohol.

EXAMPLE II 2-hydroxy, 3-decoxypropyl dimethyl dodecyl ammonium chloride: into a 500 ml. Erlenmeyer flask equipped with a reflux condenser was weighed 50.1 g. 1-chloro, 2-hydroxy, 3-decoxypropane and 42.6 g. dodecyl dimethyl amine. A magnetic stirring bar was placed in the flask and 83 cc. water was added. The reaction mixture was heated to reflux and stirred by means of a magnetic stirrer-hot plate combination. After 3 hours of refluxing, 10 cc. isopropyl alcohol was added and heating continued for 1 hour additional, at which time the reaction mixture was homogeneous. Within one half hour it began to thicken and gel. The slow addition of 113 cc. $H_2O$ and 10 cc. isopropyl alcohol lowered the viscosity and the reaction mixture remained fluid while refluxed an additional 1½ hours. The final product was a solution of 30% concentration, which solidified to a paste-like semi-solid on several days standing.

By this same procedure we have synthesized the homologous series of all the compounds varying both alkyl chains.

EXAMPLE III

N-2-hydroxy, 3-dodecoxylpropyl, N-methyl morpholinium chloride: Into a 1-l. 3-neck round bottom flask equipped with a reflux condenser, motor driven stirrer, and thermometer was weighed 139 g. 1-chloro, 2-hydroxy, 3-dodecoxypropane (0.5 mole) and 48 g. N-methyl morpholine (0.475 mole). The solvent, 157 cc. water, was added and the reaction mixture heated to reflux. The reaction mixture was refluxed with constant stirring for two hours at which time the mixture became a homogeneous solution. The viscosity of the solution started to increase so 30 cc. of additional water and 20 cc. isopropyl alcohol was added to reduce the viscosity. After another hour of reflux, 100 cc. water was added followed by 60 cc. water and 7 cc. isopropyl alcohol one-half hours later. The reaction mixture was refluxed a total of 5 hours. The product was a 33⅓% concentration solution that was slightly cloudy and contained with 5% alcohol.

The amount of alcohol must be increased with an increase in the chain length in the homologous series in order to keep the viscosity low enough that the reaction

EXAMPLE IV 1,2,4 - trimethyl[1,4-(2-hydroxy, 3-dodecoxypropyl)] piperazonium dichloride: Into a 1-l. 3-neck round bottom flask equipped with a reflux condenser, motor driven stirrer, and thermometer was weighed 139 g. 1-chloro, 2-hydroxy, 3-dodecoxypropane (0.5 mole) and 30 g. 1,2,4-trimethylpiperazine (0.25 mole). To this mixture was added 100 cc. $H_2O$ and the rapidly stirred reaction mixture was heated to reflux. After 2½ hours of reflux the mixture had become almost totally clear, and 69 cc. of water was added. The reaction mixture began to gel. Three increments of 169 cc. of water were added about 15 minutes apart. The reaction mixture was so gelled that refluxing was no longer possible since the material in the flask would climb the vessel walls when the temperature became too great. The temperature was therefore maintained at 80–85° C. for about 7 hours. The final product was 20% concentration solution that had a jelly-like consistency. If isopropyl alcohol were used at the initial addition of water, and at subsequent water additions, the gel problem would not have been encountered. The reaction conditions will otherwise remain the same with variation of the alkoxy chain from $C_8$ to $C_{18}$. The reaction can also be considered to remain the same with other variations of substituted and unsubstituted piperazines.

EXAMPLE V

N,N'-bis (2 - hydroxy, 3 - dodecoxypropyl) N,N,N',N'-tetramethyl ethylene diammonium dichloride: Into a 500 ml. Erlenmeyer flask equipped with an air cooled condenser was weighed 55.7 g. (0.2 mole 1-chloro, 2-hydroxy, 3-dodecoxypropane and 11.6 g. (0.1 mole) tetramethylethylene diamine. After the addition of 67 cc. water, the reaction mixture was heated to reflux with constant stirring by means of a hot plate-magnetic stirrer combination. Within ½ hour the heterogeneous reaction mixture cleared into a homogeneous solution, and within an hour the viscosity increased enough to cause the solution to gel. A second 67 cc. of water was added at this point followed by 20 cc. of isopropyl alcohol to reduce the viscosity and keep the mixture fluid. Refluxing was continued for two hours additional to give a clear solution which thickened somewhat on cooling.

This same procedure was used on the homologous series where the chain length of the alkoxy group on the 1-chloro, 2-hydroxy, 3-alkoxypropane varied from an eight carbon to an eighteen carbon atom chain inclusive.

EXAMPLE VI (A) A portion of 1-chloro, 2-hydroxy, 3-dodecoxy propane was weighed into a 1-l. 3-neck round bottom flask fitted with a motor driven stirrer and a reflux condenser. There was 139 g. (0.5 mole) of the above product, and 45 g. (0.45 mole) of triethyl amine was added. Stirring was started, and maintained throughout the reaction. To the reaction mixture was added 100 cc. of water. The reaction mixture was heated to reflux by means of a heating mantle. After 1½ hours of refluxing, the reaction mixture, which was heterogeneous previously, began to clear up. An additional 90 cc. of water was added at this time. After another 1½ hours, the reaction mixture was homogeneous. An additional 190 cc. of water was added and refluxing was continued for a final 1 hour. The product, 2-hydroxy, 3-dodecoxypropyl, triethyl ammonium chloride, formed a 33⅓% solution by w./v. This product reduced the interfacial tension of the benzene-water and the hexane-water interface to less than 0.1 dyne/cm. at concentration as low as 0.01%.

EXAMPLE VI (B) Several runs were made using 28 g. (0.1 mole) 1-chloro, 2-hydroxy, 3-dodecoxypropane and 10.1 g. (0.1 mole) triethylamine varying the amount of water in the solvent system. Isopropyl alcohol was used without any water added for run No. 1, then 5% of the alcohol was replaced with water in run No. 2, 10% in run No. 3, 20% in run No. 4, 30% in run No. 5, and 75% in run No. 6. Each run was in a 250 ml. Erlenmeyer flask fitted with an air cooled condenser. The flask was heated and the contents stirred by means of a hot plate-magnetic stirrer combination. The reaction was heated to reflux for a period of six hours, after which the solvent was removed by evaporation under reduced pressure and the product analyzed for oxirane oxygen and chloride ion. The procedure used for the analysis of oxirane oxygen in the presence of amines is that of Durbetaki, A. J., Anal. Chem., 30, 2024–5 (1958).

| Run: | Percent $H_2O$ in solvent | Percent oxirane | Percent chloride | Percent chloride equivalent to oxirane | Percent chloride from quaternary formation |
|---|---|---|---|---|---|
| 1 | 0 | 1.1 | 1.97 | (2.44) | (¹) |
| 2 | 5 | 0.74 | 1.92 | 1.64 | 0.28 |
| 3 | 10 | 0.66 | 1.99 | 1.47 | 0.52 |
| 4 | 20 | 1.44 | 6.56 | 3.19 | 3.37 |
| 5 | 30 | 1.01 | 5.82 | 2.24 | 3.58 |
| 6 | 75 | 0.83 | 9.18 | 1.85 | 7.33 |

¹ Not enough chloride ion was detected to be equivalent to the amount of oxirane formed. It therefore seems other side reactions are occurring and apparently no quaternary amine was formed.

EXAMPLE VII

A portion of 1-bromo, 2-hydroxy, 3-dodecoxy propane was weighed into a 250 ml. Erlenmeyer flask, fitted with an air cooled condenser. There was 32.3 g. (0.1 mole) of the above product, and 10.1 g. (0.1 mole) of triethyl amine was added. Stirring was started, and maintained throughout the reaction. To the reaction mixture was added 34 g. of water and 8 g. isopropylalcohol. The reaction mixture was heated to reflux and stirred by means of a hot plate-magnetic stirrer combination. After 2 hours of refluxing, the reaction mixture, which was heterogeneous previously, began to clear up. Because the alcohol was added initially, there was no gelling or viscosity buildup so no additional solvent was added. After another 3 hours, the reaction mixture was homogeneous, and heating was discontinued. The product, 2-hydroxy, 3-dodecoxypropyl, triethyl ammonium bromide formed a 50% by weight solution.

EXAMPLE VIII

Triethylamine hydrochloride, made from triethylamine, and hydrogen chloride and re-crystallized from acetone, 22.5 g. (0.164 mole), and 41.7 g. (circa 0.164 mole) of a mixture of glycidyl ethers (6 to 18 carbons, 5.16% oxirane oxygen) were weighed into a 500 ml. Erlenmeyer flask fitted with an air cooled condenser. The solvent, 60 cc. water, was added and the flask heated to a reflux while the contents were stirred by means of a hot plate-magnetic stirrer combination. After three hours of reflux, 4 cc. isopropyl alcohol was added and reflux continued over ¾ of an hour. The product was left to stand overnight. The following morning 60 cc. of additional water and 4 cc. additional isopropyl alcohol was added and the solution refluxed one hour to give a clear homogeneous product that was 33⅓% solids, by weight/volume, that is 33⅓ grams of product per 100 ml. of solution.

EXAMPLE IX

The above procedure was followed for another glycidyl ether mixture (14 to 18 carbon atoms, 4.35% oxirane oxygen), except that 62.4 g. (circa 0.2 mole) of glycidyl ether and 27.5 g. (0.2 mole) triethylamine amine hydrochloride was used. Water (65 cc.) was added and the mixture refluxed and stirred for two hours before 20 cc. isopropyl alcohol was added. An additional two and one-half hours of reflux was required before the solution became clear and homogeneous. An additional 65 cc. water and 20 cc. isopropyl alcohol was added and reflux continued for one and one-half hours. A final 5 cc. water and 5 cc. isopropyl alcohol was added to bring the product to 33⅓% solids by weight/volume and the product allowed to cool. On cooling it solidified so an additional 65 cc. water and 25 cc. isopropyl alcohol was added to bring the solids to 25%. This dilution also solidified on cooling to a jelly-like consistency.

EXAMPLE X

The same procedure was followed for another glycidyl ether mixture (6 to 12 carbon atoms, 6.93% oxirane oxygen) except that 19 g. (circa 0.1 mole) of glycidyl ether and 14 g. (0.1 mole) triethylamine hydrochloride was used. The solvent was 30 cc. water. After 2¾ hours of reflux, there was a great deal of foam in the reaction vessel. An additional 30 cc. water was added and reflux continued for one hour before 6 cc. isopropyl alcohol was added. After a final two hours of reflux the product was a clear homogeneous solution of 33⅓% solids by weight/volume.

The three products discussed in VIII, IX and X above were analyzed for their surfactant ability. They were all surface active and showed properties similar to corresponding products synthesized from alkoxy chlorohydrins and triethylamine.

EXAMPLE XI

Into a reaction vessel were charged 139 g. of 3-dodecoxy, 2-hydroxy propylchloride and 71.5 g. of dimethylbenzylamine followed by 165 g. of water and 45.5 g. of isopropyl alcohol to function as a solvent. With constant agitation, the reaction vessel was heated to reflux and maintained at reflux throughout the reaction. After about 2½ hours, the previously heterogeneous reaction media became homogeneous and clear. The reaction was maintained for about one additional hour before an additional amount of 165 g. of water and 45.5 g. of isopropyl alcohol was added. Heating and agitation were conducted for an additional two hours and then the product was allowed to cool. The product was in a 33⅓% active (solids) solution and was clear, homogenous and nearly water-white.

EXAMPLE XII

Into a reaction vessel were charged 38 g. of pyridine and 139 g. of 3-dodecoxy, 2-hydoxy propylchloride, followed by 147 g. of water and 30 g. of isopropyl alcohol as solvent. With constant agitation the reaction was conducted for a total time of about 4½ hours. After the first 2½ hours, the previously heterogeneous reaction became homogeneous and clear. Additional water (147 g.) and isopropyl alcohol (30 g.) were added and the mixture refluxed for about 2 more hours. The final product was a clear, homogeneous, water-white solution of 3-dodecoxy, 2-hydroxypropyl pyridinium chloride.

While most of the compounds produced in accordance with this invention possess bacteriostatic properties, some actually possess exteremely good germicidal results. The following is an example of the germicidal and detergent sanitizer test utilized with data for three representative type compounds of this invention. Samples were tested at concentrations of 200 p.p.m. quaternary in waters containing 0, 250, 500, 750, and 1000 r.p.m. hardness. The test procedure used was basically that given in Official Methods of Analysis of the A.O.A.C., Tenth Edition, 1965, pp. 87–89. The test organism was *Staphylococcus aureaus* ATCC No. 6538. The prescribed test procedure was modified as follows: (a) exposure times of 30 seconds only were used and (b) duplicate plates in place of quadruplicate plates were prepared. Letheen neutralizer blanks were used. These were prepared as specified in the above reference, paragraphs 5.012 C and D. Individual test results of 3 representative compounds is set forth in the following table.

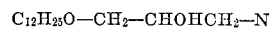

Table of Results.—A.O.A.C Germicidal and Detergent Sanitizer Tests

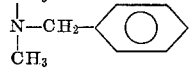

| Sample | Concentration [1], p.p.m. | Hardness [2], p.p.m. | Test No. | Exposure 30 seconds 1.0 | 0.1 | Percent inoculum reduction |
|---|---|---|---|---|---|---|
| A | 200 | 0 | 1 | 0 / 3 | 0 / 0 | 99.9999 |
| CH₂CH₃ \| N—CH₂CH₃ \| CH₂CH₃  Triethylamine | 200 | 250 | 2 | 900 / 800 | 64 / 90 | 99.995 |
|  | 200 | 500 | 3 | TNC / TNC | TNC / TNC | 99.9 |
|  | 200 | 750 | 4 | TNC / TNC | TNC / TNC | 99.9 |
|  | 200 | 1,000 | 5 | TNC / TNC | TNC / TNC | 99.9 |
| B | 200 | 0 | 6 | 0 / 0 | 0 / 0 | 99.9999 |
| CH₃ \ N—O  N-methyl morpholine | 200 | 250 | 7 | 200 / 390 | 22 / 32 | 99.997 |
|  | 200 | 500 | 8 | TNC / TNC | TNC / TNC | 99.9 |
|  | 200 | 750 | 9 | TNC / TNC | TNC / TNC | 99.9 |
|  | 200 | 1,000 | 10 | TNC / TNC | TNC / TNC | 99.9 |
| C | 200 | 0 | 11 | 0 / 0 | 0 / 0 | 99.9999 |
| CH₃ \| N—CH₂—⟨ ⟩ \| CH₃  Dimethylbenzylamine | 200 | 250 | 12 | 0 / 0 | 0 / 0 | 99.9999 |
|  | 200 | 500 | 13 | 0 / 0 | 0 / 0 | 99.9999 |
|  | 200 | 750 | 14 | 0 / 0 | 0 / 0 | 99.9999 |
|  | 200 | 1,000 | 15 | 0 / 0 | 0 / 0 | 99.9999 |

[1] P.p.m. of active quaternary.
[2] Hardness as $CaCO_3$

NOTE.—Inoculum count 10⁻⁸ ml. 78, 121, 88, 86. Avg. 93; Medication flash population 93× 10⁶; TNC=colonies too numerous to count.

The data in the table indicate A and B to be good bactericides in soft water and up to 250 p.p.m. hardness but the dimethyl benzyl dodecoxy hydroxy propyl ammonium chloride is active in water of at least 1000 p.p.m. hardness.

To obtain a rapid reaction rate it is desirable to have the reaction take place at a temperature above 75° C. The production of by-products at temperatures above 100° C. as well as the necessity of a closed system makes use of these temperatures impractical. The preferred temperature range is from 80 to 100° C. Any convenient means for maintaining the desired temperature may be used such as a jacketed vessel or internal heat exchange coils.

Since the reaction takes place in the liquid phase, pressure is not an important factor in the reaction. Atmospheric, subatmospheric and superatmospheric pressures may be used. In many instances, it is convenient to reflux the solvent system.

Obviously many modifications and variations of the invention as hereinbefore set forth may be made without departing from the spirit and scope thereof, and therefore only such limitations should be imposed as are indicated in the appended claims. The compositions of this invention can be made by methods other than those specifically set forth herein.

We claim:
1. A diquaternary ammonium halide having a formula selected from the group consisting of

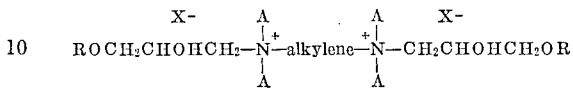

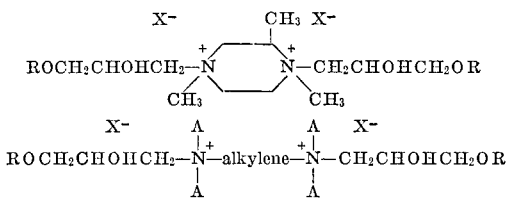

and

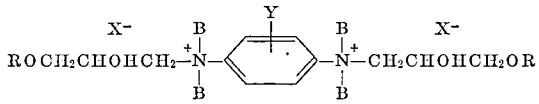

wherein X is halogen, A is alkyl of 1 to 8 carbons or benzyl, B is alkyl of 1 to 4 carbons or benzyl, Y is hydrogen or chloro, R is alkyl of 8 to 18 carbon atoms and alkylene is from 2 to 6 carbon atoms.

2. A diquaternary ammonium halide of claim 1 wherein the formula is:

$$\text{ROCH}_2\text{CHOHCH}_2-\overset{A}{\underset{A}{\overset{+}{N}}}-\text{alkylene}-\overset{A}{\underset{A}{\overset{+}{N}}}-\text{CH}_2\text{CHOHCH}_2\text{OR} \quad X^- \quad X^-$$

wherein X is halogen, A is alkyl of 1 to 8 carbons or benzyl, and R is alkyl of 8 to 18 carbons.

3. The compound of claim 1 wherein the diquaternary ammonium halide is N,N' - bis(2 - hydroxy, 3-dodecoxypropyl) N,N,N',N' tetramethyl ethylene diammonium dihalide.

4. The compound of claim 1 wherein the diquaternary ammonium halide is N,N'-bis(2-hydroxy, 3-dodecoxypropyl) N,N,N',N' tetramethyl ethylene diammonium dichloride.

5. The compound of claim 1 wherein the diquaternary halide is 1,2,4 - trimethyl [1,4 - (2 - hydroxy, 3-dodecoxypropyl)]piperazonium dichloride.

References Cited
UNITED STATES PATENTS

| | | | |
|---|---|---|---|
| 2,548,679 | 4/1951 | Olin | 260—567.6 |
| 3,318,954 | 5/1967 | Curtin, Jr. | 260—567.6 |
| 2,775,604 | 12/1956 | Zech | 260—404.5 |
| 3,412,160 | 11/1968 | Schierholt | 260—637 |

ALEX MAZEL, Primary Examiner

J. TOVAR, Assistant Examiner

U.S. Cl. X.R.

260—247.7, 286, 326.5, 567.6; 424—250, 329

PO-1050
(5/69)

UNITED STATES PATENT OFFICE
CERTIFICATE OF CORRECTION

Patent No. 3,567,729    Dated March 2, 1971

Inventor(s) Morton Lewis and Thomas W. Findley

It is certified that error appears in the above-identified patent and that said Letters Patent are hereby corrected as shown below:

Column 2, line 54 should be $\overset{\oplus}{B}$

Column 3, line 21 -- cancel "nitroen" and substitute therefor -- nitrogen --; line 29 should be $\overset{\ominus}{X}$;

line 30 should be $R^3$.

Column 4, line 75 -- after an, cancel "a mine" and substitute therefor -- amine --.

Column 6, line 3 -- after solution, cancel "with" and substitute therefor -- which --;

line 72 -- after contained, cancel "with" and substitute therefor -- about --.

Column 7, line 34 -- after 55.7 g., cancel "(0.2 mole" and substitute therefor -- (0.2 mole) --.

Column 8, line 14 -- after Chem., cancel "30" and substitute therefor -- _30_ --.

Column 10, line 26 -- after 1000, cancel "r.p.m." and substitute therefor -- ppm --.

Column 12, lines 25 and 26 -- after diquaternary, insert --ammonium--.

Signed and sealed this 14th day of March 1972.

(SEAL)
Attest:

EDWARD M. FLETCHER, JR.          ROBERT GOTTSCHALK
Attesting Officer                Commissioner of Patents